United States Patent
Okumura et al.

(10) Patent No.: US 8,571,824 B2
(45) Date of Patent: Oct. 29, 2013

(54) VEHICULAR DOOR CLOSING-INSPECTION APPARATUS AND VEHICULAR DOOR CLOSING-INSPECTION METHOD

(75) Inventors: Yasuo Okumura, Tsu (JP); Ryo Taniguchi, Yokkaichi (JP); Kuniaki Nishimura, Kameyama (JP); Koji Fujiwara, Suzuka (JP); Takanobu Fujii, Suzuka (JP); Kazuhiko Sumida, Yokkaichi (JP)

(73) Assignee: Honda Motor Co., Ltd., Tokyo (JP)

( * ) Notice: Subject to any disclaimer, the term of this patent is extended or adjusted under 35 U.S.C. 154(b) by 765 days.

(21) Appl. No.: 12/516,056

(22) PCT Filed: Nov. 5, 2007

(86) PCT No.: PCT/JP2007/071487
§ 371 (c)(1),
(2), (4) Date: May 22, 2009

(87) PCT Pub. No.: WO2008/065859
PCT Pub. Date: Jun. 5, 2008

(65) Prior Publication Data
US 2009/0319213 A1 Dec. 24, 2009

(30) Foreign Application Priority Data
Nov. 30, 2006 (JP) ................ P2006-323480

(51) Int. Cl.
*G01N 37/00* (2006.01)
*B62D 65/18* (2006.01)
(52) U.S. Cl.
USPC ................ 702/82; 702/81; 700/213
(58) Field of Classification Search
USPC ............ 702/33–40, 81–84; 700/213
See application file for complete search history.

(56) References Cited

U.S. PATENT DOCUMENTS

| 3,628,249 | A | * | 12/1971 | Wurl ............................ 433/40 |
| 3,877,299 | A | * | 4/1975 | Clayton et al. ............... 73/132 |
| 4,342,536 | A | | 8/1982 | Akeel et al. |
| 4,744,500 | A | * | 5/1988 | Hatakeyama et al. ......... 228/4.1 |
| 4,836,467 | A | * | 6/1989 | Rodgers ...................... 15/316.1 |
| 5,624,696 | A | | 4/1997 | Watanabe et al. ............. 426/231 |
| 6,062,079 | A | * | 5/2000 | Stewart .......................... 73/488 |
| 6,965,438 | B2 | * | 11/2005 | Lee et al. ...................... 356/625 |
| 2004/0120568 | A1 | * | 6/2004 | Kidd et al. .................... 382/141 |
| 2005/0274269 | A1 | * | 12/2005 | Nishimoto et al. ........... 101/288 |

FOREIGN PATENT DOCUMENTS

| JP | 59-5906 A | 1/1984 |
| JP | 61-150276 U | 9/1986 |

(Continued)

*Primary Examiner* — Marc Armand
*Assistant Examiner* — Michael Dalbo
(74) *Attorney, Agent, or Firm* — Birch, Stewart, Kolasch & Birch, LLP (57) ABSTRACT

A door closing-inspection apparatus for a vehicle includes a first lightening and light-receiving device which strides over a transferring conveyer in a finished vehicle inspection line which inspects a finished vehicle while being transferred; a pair of door-closing devices arranged at positions on a downstream side of the first lightening and light-receiving device and on symmetrically both sides of a length of the transferring conveyer; a second lightening and light-receiving device arranged on a downstream side of the door-closing devices which strides over the transferring conveyer; a pair of door distance-measuring sensors arranged at positions on a downstream side of the second lightening and light-receiving device is on symmetrically both sides of the length of the transferring conveyer; and a controller which is connected to the first and second lightening and light-receiving devices, the door-closing devices, the sensors, and a driving source controller of the transferring conveyer.

8 Claims, 10 Drawing Sheets

(56) References Cited

FOREIGN PATENT DOCUMENTS

| JP | 62-31583 U | 2/1987 |
| JP | 1-172986 U | 12/1989 |
| JP | 4-14584 U | 2/1992 |
| JP | 6-135358 A | 5/1994 |
| JP | 6-246592 A | 9/1994 |
| JP | 11-197976 A | 7/1999 |
| JP | 2004-50964 A | 2/2004 |
| JP | 2005-1543 A | 1/2005 |

* cited by examiner

FIG. 13

VEHICULAR DOOR CLOSING-INSPECTION APPARATUS AND VEHICULAR DOOR CLOSING-INSPECTION METHOD

TECHNICAL FIELD

The present invention relates to a vehicular door closing-inspection apparatus and a vehicular door closing-inspection method in a finished vehicle inspection line used for assembling a vehicle.

Priority is claimed on Japanese Patent Application No. 2006-323480, the contents of which are incorporated herein by reference.

BACKGROUND ART

In a vehicular assembling line, a static and dynamic final inspection for a vehicular body in which assembling thereof is finished (i.e., a finished vehicle) is performed at a finished vehicle inspection line. This inspection includes an inspection item of checking closing of doors.

As shown, for example, in Japanese Unexamined Patent Application No. 2004-050964, the conventional inspection was performed by (i) providing a jig having a spring balance between a door side armrest and a buckle of a seatbelt, (ii) engaging each of a tongue (one engaging portion) and hook (another engaging portion) provided on both sides of the jig with the armrest or the buckle, (iii) holding a door by an operator in this opened state, (iv) releasing the door when the spring balance indicates a certain value to simulate the door closing motion in a certain closing speed, and (v) inspecting the degree of the door closing at this time by viewing it.

On the other hand, as shown, for example, in Japanese Unexamined Patent Application No. 2005-015343, another conventional inspection was also made by installing a load cell and an angular velocity sensor into a door of the finished vehicle, and performing a door closing operation by an operator in this state. In this case, the inspection whether the door is properly closed or not is made by measuring the load by the load cell and measuring the door closing velocity by the angular velocity sensor.

DISCLOSURE OF THE INVENTION

Problems to be Solved by the Invention

However, in the former prior art, an inspection man-hour was large because installing and removing the jig need long hours and a viewing inspection for checking the degree of the door closing also takes long hours; therefore, it is not suitable for employing it in a mass production factory.

In addition, the later prior art also has the same problems as those of the former prior art because installation of the inspection apparatus into the door, and opening and closing operations of the door by the operator takes large man-hours.

The present invention was made in view of the above-mentioned circumstances and has an object of providing a vehicular door closing-inspection apparatus and a vehicular door closing-inspection method which can reduce man-hours in an inspection process and are applicable to an inspection of a variety of finished vehicles.

Means for Solving the Problems

The present invention employed the followings in order to achieve the above-mentioned object.

(1) A door closing-inspection apparatus for a vehicle according to a first aspect of the present invention is provided with: a first lightening and light-receiving device which is arranged so as to stride over a transferring conveyer in a finished vehicle inspection line which inspects a finished vehicle while transferring the finished vehicle; a pair of door-closing devices arranged at positions where are on a downstream side of the first lightening and light-receiving device, and are on symmetrically both sides of a length of the transferring conveyer; a second lightening and light-receiving device arranged on downstream side of the door-closing devices so as to stride over the transferring conveyer; a pair of door distance-measuring sensors arranged at positions where are on a downstream side of the second lightening and light-receiving device, and are on symmetrically both sides of the length of the transferring conveyer; and a controller which is connected to the first lightening and light-receiving device, the second lightening and light-receiving device, the door-closing devices, the distance-measuring sensors, and a driving source controller of the transferring conveyer. Each of the door-closing devices is provided with a linear cylinder which can control a rod stroke thereof, and a door-pressing pad which is attached via a spherical joint to a rod distal end portion of the linear cylinder. Each of the door-closing devices is activated to close an opened door of the finished vehicle after a predetermined time has passed since the first lightening and light-receiving device has detected a vehicular body of the finished vehicle. Each of the distance-measuring sensors is activated to measure a distance with respect to a vehicular body side face of the finished vehicle after a predetermined time has passed since the second lightening and light-receiving device has detected the vehicular body of the finished vehicle.

(2) A door closing-inspection apparatus for a vehicle according to a second aspect of the present invention is provided with: a pair of door-closing devices which is arranged on symmetrically both sides of a length of a transferring conveyer, so as to stride over the transferring conveyer in a finished vehicle inspection line which inspects a finished vehicle while transferring the finished vehicle; a pair of first lightening and light-receiving devices which are arranged on an upstream side of the transferring conveyer, so as to neighbor on the pair of door-closing devices; two pairs of second lightening and light-receiving devices which are arranged on an downstream side of the door-closing devices, so as to stride over the transferring conveyer; a pair of distance-measuring sensors which are arranged at positions where are between the two pairs of second lightening and light-receiving devices and are symmetrically on both sides of the length of the transferring conveyer; and a controller which is connected to the first lightening and light-receiving devices, the second lightening and light-receiving devices, the door-closing devices, and the distance-measuring sensors. Each of the door-closing devices is provided with a linear cylinder which can control a rod stroke thereof, and a door-pressing pad which is attached via a spherical joint to a rod distal end portion of the linear cylinder. Each of the door-closing devices is activated to close an opened door of the finished vehicle at the same time as the first lightening and light-receiving devices has detected that a distance between the first lightening and light-receiving devices and the door has reached a predetermined distance. Each of the distance-measuring sensors is activated to measure a distance with respect to the vehicular body side face of the finished vehicle at the same time as the two pairs of the second lightening and light-receiving devices detect the vehicular body of the finished vehicle.

(3) In the door closing-inspection apparatus for a vehicle, according to the above first or second aspect, the controller may be connected to an alarming device and a displaying device which indicates a result of a door closing-inspection.

(4) In the door closing-inspection apparatus for a vehicle, according to the above first or second aspect, each of the door-closing devices may be provided on a tuning table so as to be rotatable around a vertical axis and be fixable at an arbitrary rotational position.

(5) The door closing-inspection apparatus for a vehicle, according to the above first aspect, may be further provided with a barcode reader which reads a barcode which is appended to the finished vehicle and indicates a vehicular type and specification.

(6) In addition, a door closing-inspection method for a vehicle according to a first aspect of the present invention is a door closing-inspection method for a vehicle, by a door closing-inspection apparatus for a vehicle provided with: a first vehicular body detection device and a second vehicular body detection device which are arranged at a neighbor of a transferring conveyer of a finished vehicle inspection line which inspects a finished vehicle while transferring the finished vehicle; a door-closing device which closes an opened door of the finished vehicle at a predetermined velocity; a door closing detection device which detects a degree of closing of the closed door; a controller which is connected to the first vehicular body detection device, the second vehicular body detection device, the door-closing device, the door closing detection device, and a driving source controller of the transferring conveyer, the door closing-inspection method for a vehicle includes the steps of: closing the door by activating the door-closing device upon receiving signals from the first vehicular body detection device and the driving source controller; and detecting the degree of closing of the door by activating the door closing detection device upon receiving signals from the second vehicular body detection device and the driving source controller.

In addition, a door closing-inspection method for a vehicle according to a first aspect of the present invention is a door closing-inspection method for a vehicle, by a door closing-inspection apparatus for a vehicle provided with: a door-closing device which is arranged at a neighbor of a transferring conveyer of a finished vehicle inspection line which inspects a finished vehicle while transferring the finished vehicle, and closes an opened door of the finished vehicle at a predetermined velocity; a door detection device which is arranged on an upstream side of the transferring conveyer than the door-closing device, so as to neighbor on the door-closing device; a vehicular body inspection device which is arranged on a more downstream side of the transferring conveyer than the door-closing device; a door closing detection device which detects a degree of closing of the closed door; and a controller which is connected to the door detection device, the vehicular body detection device, the door-closing device, and the door closing detection device, the door closing-inspection method for a vehicle including the steps of: closing the door by activating the door-closing device to abut on a pressed face which is located below a position of a door outer handle of the door, and to vertically apply a pressing force to the pressed face at a predetermined velocity, when the controller determined that a distance between the door and the door closing detection device has reached a predetermined distance based on a signal from the door detection device; and detecting the degree of closing of the door by activating the door closing detection device upon receiving a signal from the vehicular body detection device.

Effects of the Invention

According to the present invention described in the above (1), the closing operation is performed by activating the door-closing devices at the predetermined door closing timing while sequentially transferring the finished vehicles by the transferring conveyer, to press the door with the door-pressing pad. Thereafter, by activating the distance-measuring sensors at the predetermined measuring timing to continuously measure the distance with respect to the vehicular body side face while striding over the closed door, it is possible to automatically inspect whether the doors are completely closed by the predetermined closing operations or not. That is, it is possible to automatically perform an inspection (door closing-inspection) whether the door of the finished vehicle can be completely closed by a predetermined condition, in an inspection line. Accordingly, it is possible to decrease large man-hours in a finished vehicle inspection process.

Furthermore, since the door pressing pad is attached via the spherical joint to the rod distal end portion of the linear cylinder, it is possible to apply adequate pressing force onto the doors having different inclinations and the like. Accordingly, it is easily applicable to the variety of finished vehicles.

According to the present invention described in the above (2), it is possible to achieve the object of the present invention as same as the present invention described in the above (1).

In the case of the above (3), it is possible to easily and reliably detect a finished vehicle having a defect in closing the door.

In the case of the above (4), it is possible to easily realize the most suitable arrangement of the door-closing device in relation to the variety of finished vehicles.

In the case of the above (5), it is possible to automatically and easily set the most suitable door closing timing and the measuring timing of the vehicular body side face, to the variety of finished vehicles.

According to the present invention described in the above (6), at first, the first vehicular body detection device inspects the vehicular body of the finished vehicle while sequentially transferring the finished vehicles by the transferring conveyer. Thereafter, this inspection information is judged together with transferring velocity information from the driving source controller, and if it is judged that the finished vehicle is transferred to the predetermined door closing operation position, the door-closing device is activated to perform the predetermined door closing operation. Subsequently, after the second vehicular body detection device has detected the vehicular body of the finished vehicle, if it is judged that the finished vehicle has been transferred to the predetermined door closing detection position based on the detection information together with transferring velocity information from the driving source controller, the door closing detection device can be activated to perform the predetermined door closing detection. That is, it is possible to automatically perform an inspection (door closing-inspection) whether the door of the finished vehicle can be completely closed in a predetermined condition, in an inspection line. Accordingly, it is possible to decrease large man-hours in a finished vehicle inspection process.

According to the present invention described in the above (7), it is possible to achieve the object of the present invention as same as the present invention described in the above (6).

EXPLANATIONS FOR THE REFERENCE SYMBOLS

C finished vehicle (vehicle)
W vehicular body
D door
1 finished vehicle inspection line
2 slat conveyor (transferring conveyer)
10 door closing-inspection device
11 first lightening and light-receiving device (first vehicular body detection device)
12 second lightening and light-receiving device (second vehicular body detection device)
13 laser distance-measuring device (distance-measuring sensor, door closing detection device)
14 controller (control device)
15 alarming device
16 displaying device
17 driving source controller (driving source controller)
18 barcode reader
18b barcode
21 door-closing device (door-closing device)
22 linear cylinder
23 door-pressing pad
24 ball joint (spherical joint)
25 turn table

BEST MODE FOR CARRYING OUT THE INVENTION

Figure 1:
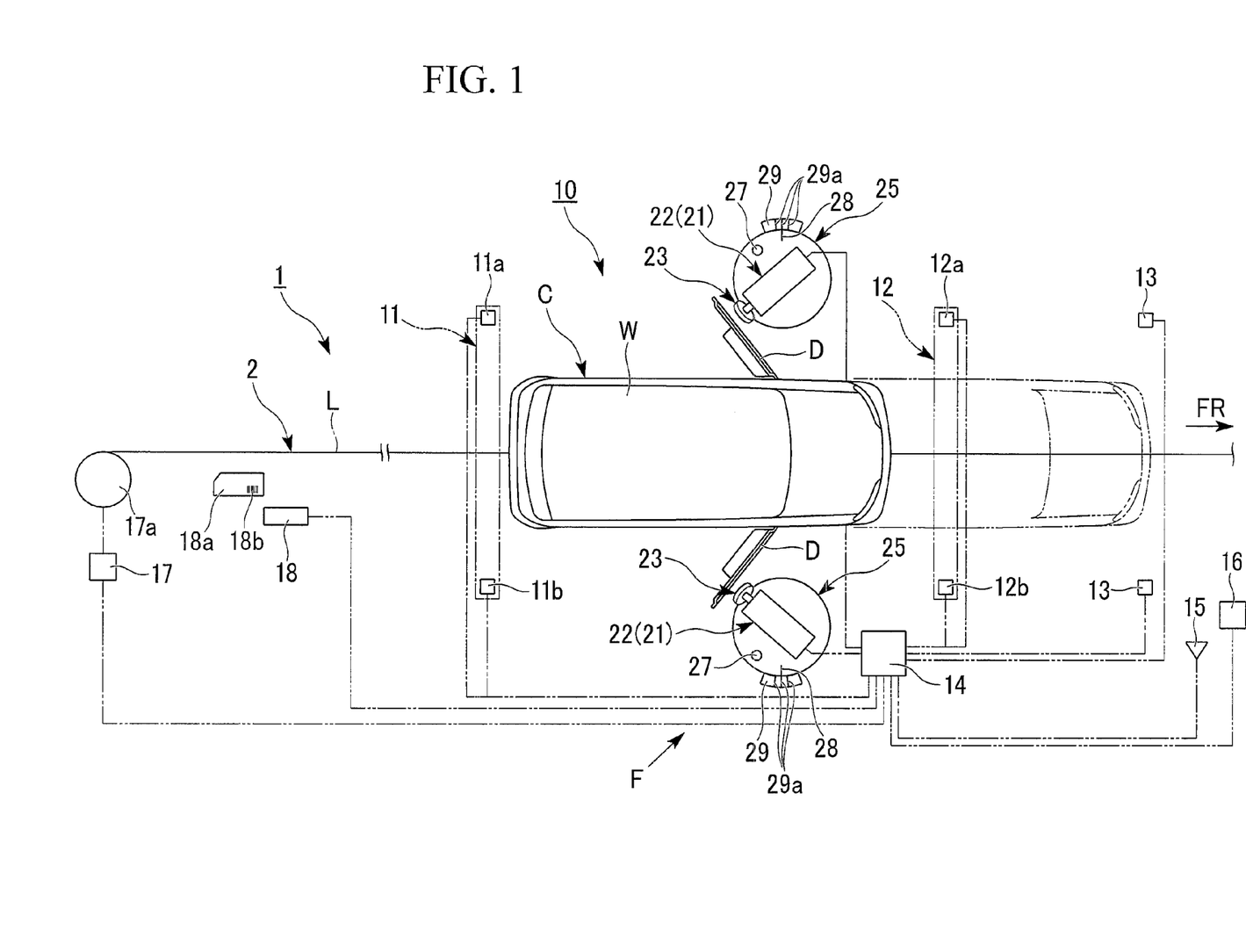
FIG. 1 is a plan view showing a general construction of a finished vehicle inspection line according to a first embodiment of the present invention.

Embodiments of the present invention will be explained below with reference to the drawings.
First Embodiment
Firstly, a first embodiment of the present invention will be explained below.
FIG. 1 is a plan view showing a general construction of a finished vehicle inspection line 1 utilized in a manufacturing of vehicles. A vehicle body W of a finished vehicle C which was completely assembled is transferred by a slat conveyor 2 and moves along the finished vehicle inspection line 1 from an upstream side (left side in FIG. 1) to downstream side (right side in FIG. 1). The finished vehicle C is arranged such that the length thereof follows the transferring direction, and is transferred in a state in which a vehicle front direction (indicated by an arrow "FR" in FIG. 1) follows a downstream side in the transferring direction. In the finished vehicle inspection line 1, a vehicle door closing-inspection is performed for inspecting a closing performance of side doors on the both sides (hereinafter, referred to as "door") D of the finished vehicle C with respect to the vehicle body W using a door closing-inspection apparatus 10.

A first lightening and light-receiving device 11 is provided on the upstream side of the door closing-inspection apparatus 10 that performs the vehicle door closing-inspection, so as to stride over the slat conveyor 2. The first lightening and light-receiving device 11 is a combination of a lightening device 11a having a photoelectric tube, and a light-receiver 11b corresponding to the lightening device 11a. The lightening device 11a and the light-receiver 11b are arranged on both sides of an axis L that follows along the length of the slat conveyor 2 (i.e., the transferring direction) so as to be symmetric centering on the axis L. While the finished vehicle C passes between the lightening device 11a and the light-receiver 11b, transmission and reception of the light between the lightening device 11a and the light-receiver 11b are shaded by the vehicle body W of the finished vehicle C, and thereby detecting the arrival of the finished vehicle C into the vehicle door closing-inspection process.

A pair of door-closing devices 21 is provided at a position where is more downstream side than the first lightening and light-receiving device 11 of the door closing-inspection apparatus 10, and is on the both sides of the axis L of the slat conveyor 2 so as to be symmetric. With also reference to FIG. 2, each of the door-closing devices 21 is provided with a linear cylinder 22 that can control the stroking speed of a rod thereof, and a door-pressing pad 23 attached to a rod distal end portion of the linear cylinder 22 via a ball joint 24. With this construction, opened doors D can be closed with pushing them by the door-pressing pads 23. Each of the door-closing devices 21 is arranged via turning table 25 on a setting floor so as to be rotatable around a vertical axis.

A second lightening and light-receiving device 12 is provided on the more downstream side than the door-closing devices 21 of the door closing-inspection apparatus 10, so as to stride over the slat conveyor 2. The second lightening and light-receiving device 12 is, as same as the first lightening and light-receiving device 11, a combination of a lightening device 12a and a light-receiver 12b, and these lightening device 12a and the light-receiver 12b are arranged on the both sides of the axis L of the slat conveyor 2 so as to be symmetric. While the finished vehicle C passes between the lightening device 12a and the light-receiver 12b, transmission and reception of the light between the lightening device 12a and the light-receiver 12b are shaded by the vehicle body W of the finished vehicle C, and thereby detecting the finished vehicle C passing through the position where is more downstream side than the door closing operation position.

A pair of laser distance-measuring devices 13 is provided at positions where are more downstream side than the second lightening and light-receiving device 12 for the vehicle door closing-inspection, and is on the both sides of the axis L of the slat conveyor 2 so as to be symmetric. Each of the laser distance-measuring devices 13 can measure the distance with the side face of the vehicle body W while the finished vehicle C passes between the laser distance-measuring devices 13.

The first and second lightening and light-receiving devices 11 and 12, each of the door-closing devices 21, and each of the laser distance-measuring devices 13 are electrically (communicatingly) connected to a controller 14 which controls the entire operations of the door closing-inspection apparatus 10. Furthermore, the controller 14 is electrically connected with: an alarming device 15 and a displaying device 16 that indicate the results of the door closing-inspection; a driving source controller 17 that controls an operation of a driving source 17a of the slat conveyor 2; and a barcode reader 18 that is arranged at the upstream side process of the finished vehicle inspection line 1, and reads a barcode 18b indicating the type of vehicle, specification, and the like, stored in an inspection card 18a appended to the finished vehicle C.

The finished vehicle C to be transferred to the vehicle door closing-inspection process is inspected at the adjacent and upstream side process, and is thereafter transferred to the next process (i.e., the vehicle door closing-inspection process) with doors D opened centering on hinge axes provided on front ends thereof and extending in the vertical direction. The opening positions (angle) of the doors at this time are set as a first-stage opening stop position of each door checkers. That is, the finished vehicle C is transferred while keeping opening positions of the each door D, that is specified for each type of vehicles. Moreover, the door checker is a well-known device that is provided near hinges of the each door D, maintains the predetermined door opening positions, and provides an opening and closing degree feeling to an occupant.

When the first lightening and light-receiving device 11 detects the coming of the finished vehicle C into the vehicle door closing-inspection process, each of the door-closing devices 21 is activated, and performs the predetermined door closing operation to the both of the opened doors D after the predetermined time T1 has passed since the detection of the coming finished vehicle C (in other words, after the finished vehicle C has been transferred to the predetermined door closing operation position).

Thereafter, when the second lightening and light-receiving device 12 detects that the finished vehicle C has began passing through the predetermined position on the more downstream side than the door closing operation position, each of the laser distance-measuring devices 13 is activated after the predetermined time T2 has passed since the detection (in other words, after the finished vehicle C has been transferred to the predetermined door closing detection position), and continuously measures the distances with respect to the both side faces of the vehicle body W of the finished vehicle C, while striding over the doors D after the closing operation thereof.

Figure 9:
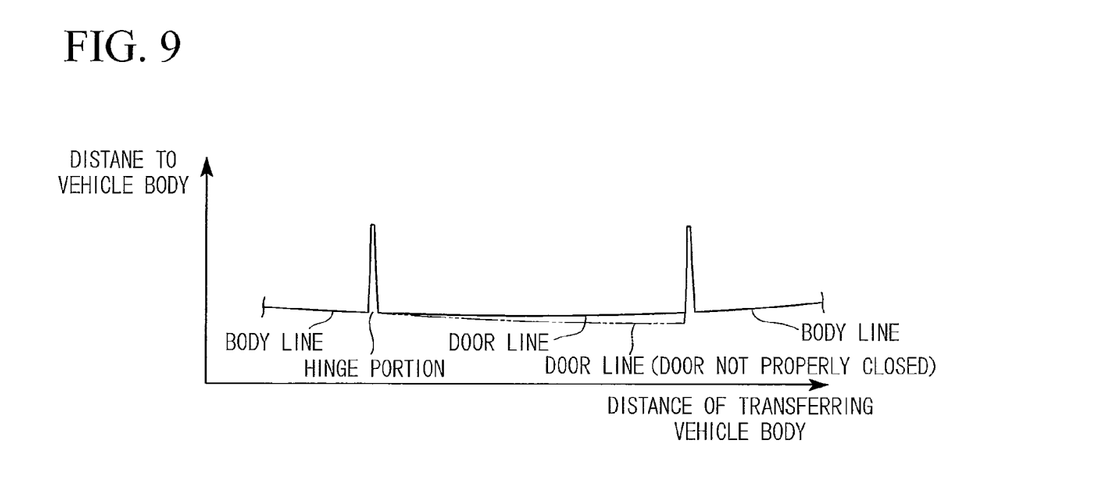
FIG. 9 is a graph showing the measurement result by a laser distance-measuring device of the above-mentioned finished vehicle inspection line, and the vertical line indicates a distance to a vehicular body side face while the horizontal line indicates a transferring distance.

If the distance to the outer surface of the door D in the measurement results at this time (refer to "DOOR LINE" in FIG. 9) is within a geometrical tolerance zone, then it is determined that the door D is completely closed by the closing operation, while if the distance is out of the geometrical tolerance zone, then it is determined that the door D after the closing operation is incompletely closed. Like this, it is possible to automatically inspect the door closing performance by the predetermined closing operation.

Figure 8:
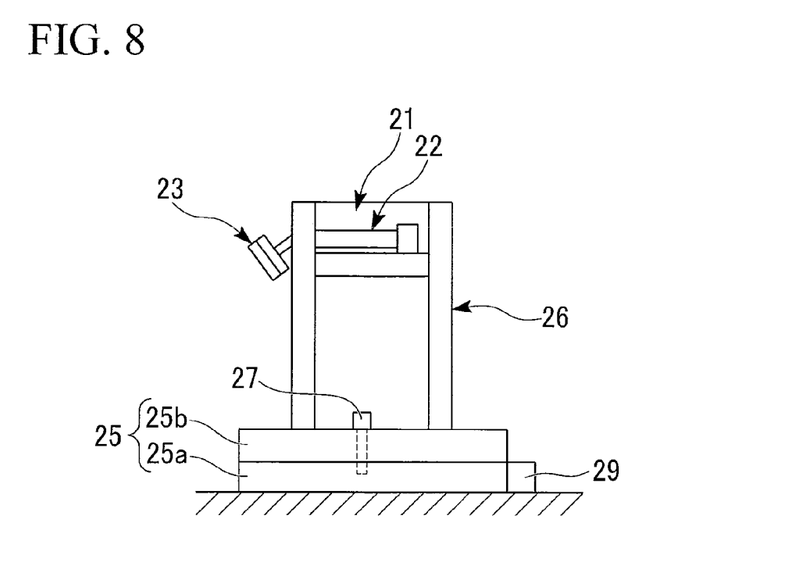
FIG. 8 is a view taking along an arrow F shown in FIG. 1.

As shown in FIGS. 1 and 8, each of the door-closing devices 21 is supported on the turning table 25 via a base unit 26. The turning table 25 is provided with: a base 25a that has a flat disc shape and is fixed on the setting floor; and a table main body 25b that has a flat disc shape having the substantially the same diameter as that of the base 25a, and is mounted on the base 25a so as to be rotatable.

A locking bolt 27 is screwed from the upside through a part on the outer circumferential side of the table main body 25b; and the distal end of the locking bolt 27 penetrates the table main body 25b, and is screwed into the base 25a. With this construction, the rotation of the table main body 25b with respect to the base 25a is fixed at the predetermined rotational position.

A reference marking 28 is labeled on a part of the outer circumstance of the table main body 25b as a reference of the rotational position thereof. On the other hand, a portion on the outer circumstance side of the base 25a where is close to the reference marking 28, a fan-shaped scaling portion 29 that expands outward in diameter is unitarily provided on the outer circumstance side of the base 25a. By matching any one of the plural scales 29a appended to the scaling portion 29 with the reference marking 28, the rotational positions to the base 25a (i.e., the setting floor) of the table main body 25b and the door-closing devices 21 that is to be fixed to the table main body 25b can be set to the predetermined position. In addition, by screwing the locking bolt 27 into the table main body 25b in this state, the rotational positions to the base 25a of the table main body 25b and the door-closing devices 21 can be fixed.

Figure 2:
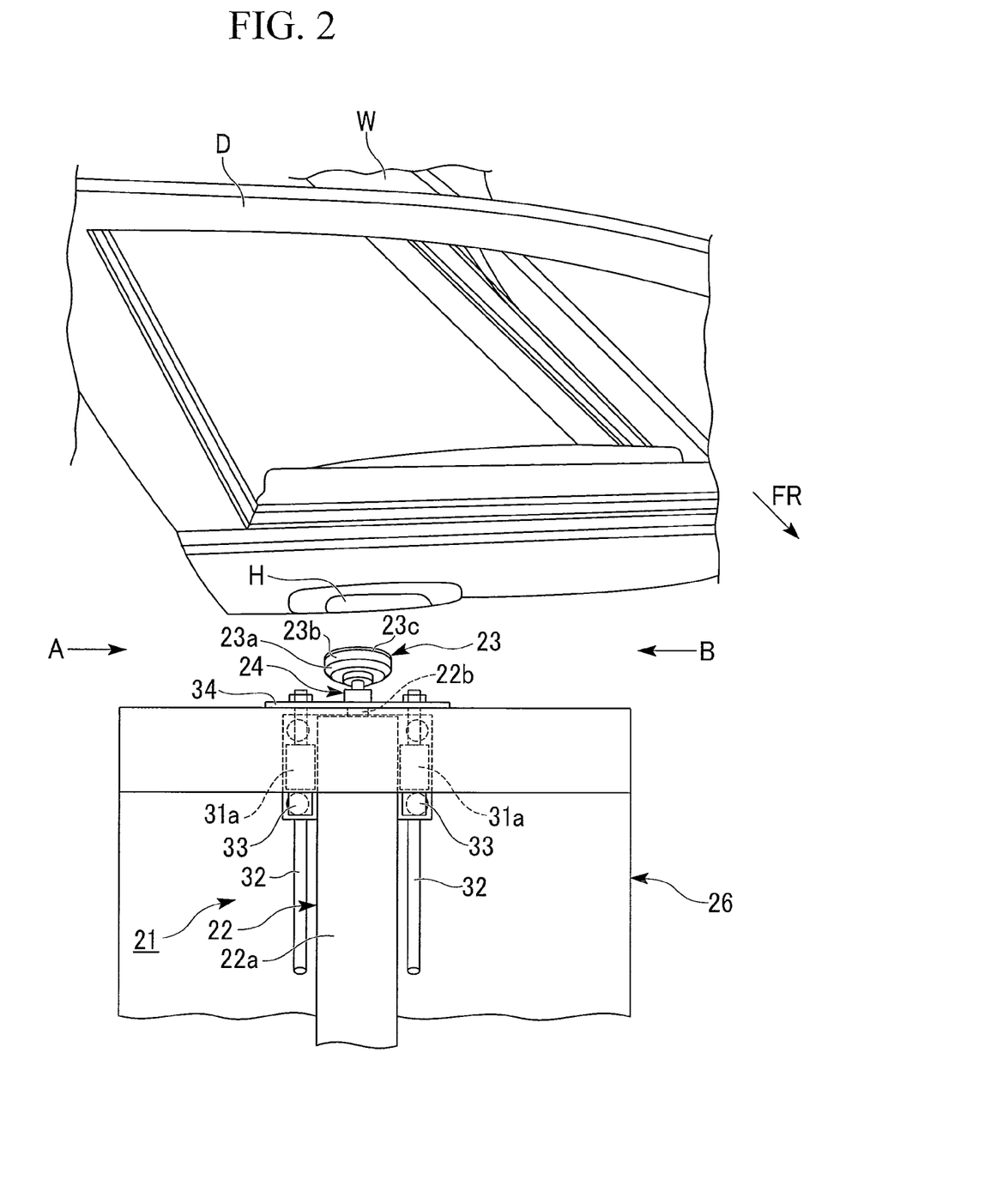
FIG. 2 is an enlargement view of an essential part of FIG. 1.
Figure 3:
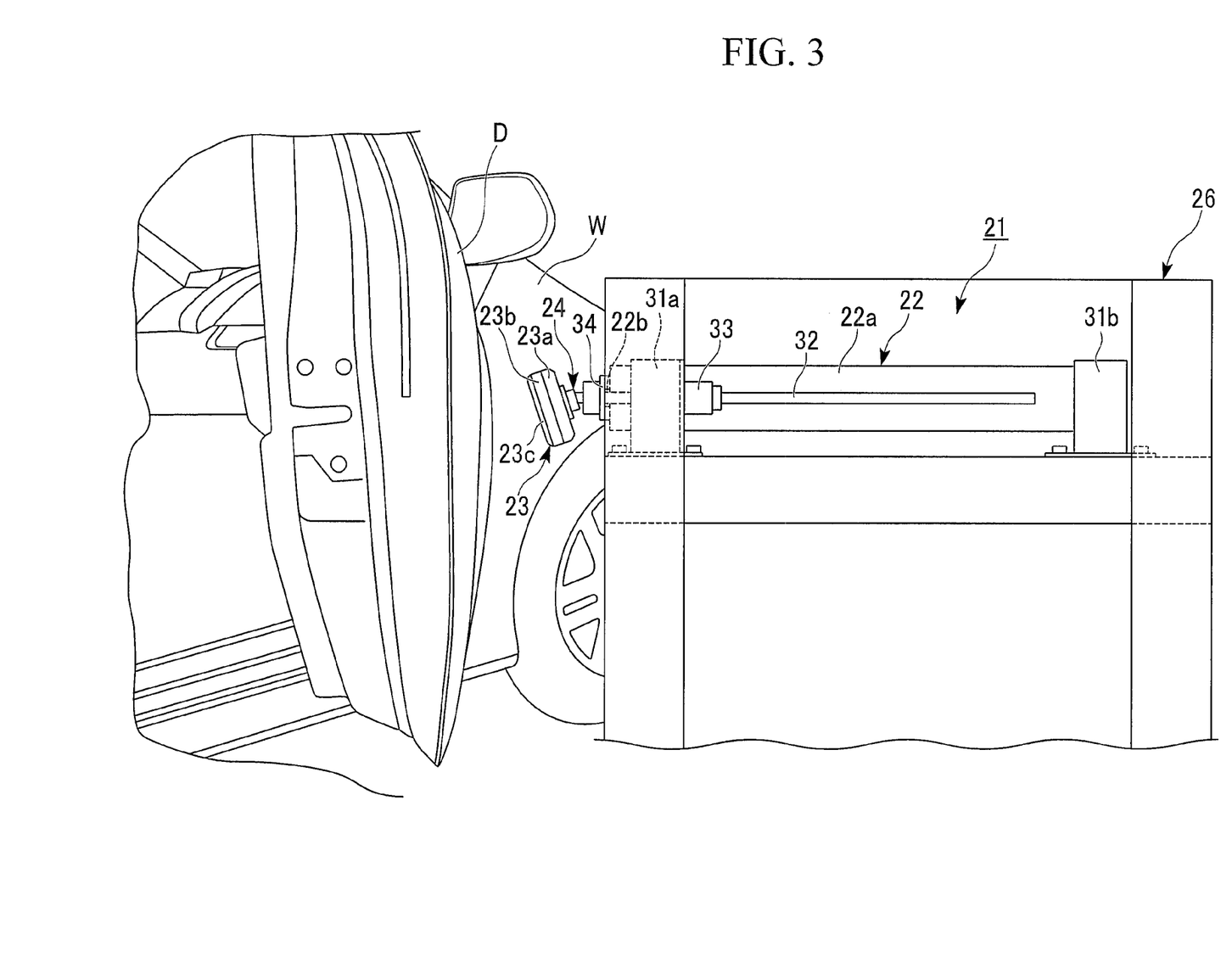
FIG. 3 is a view taking along an arrow A shown in FIG. 2.
Figure 4:
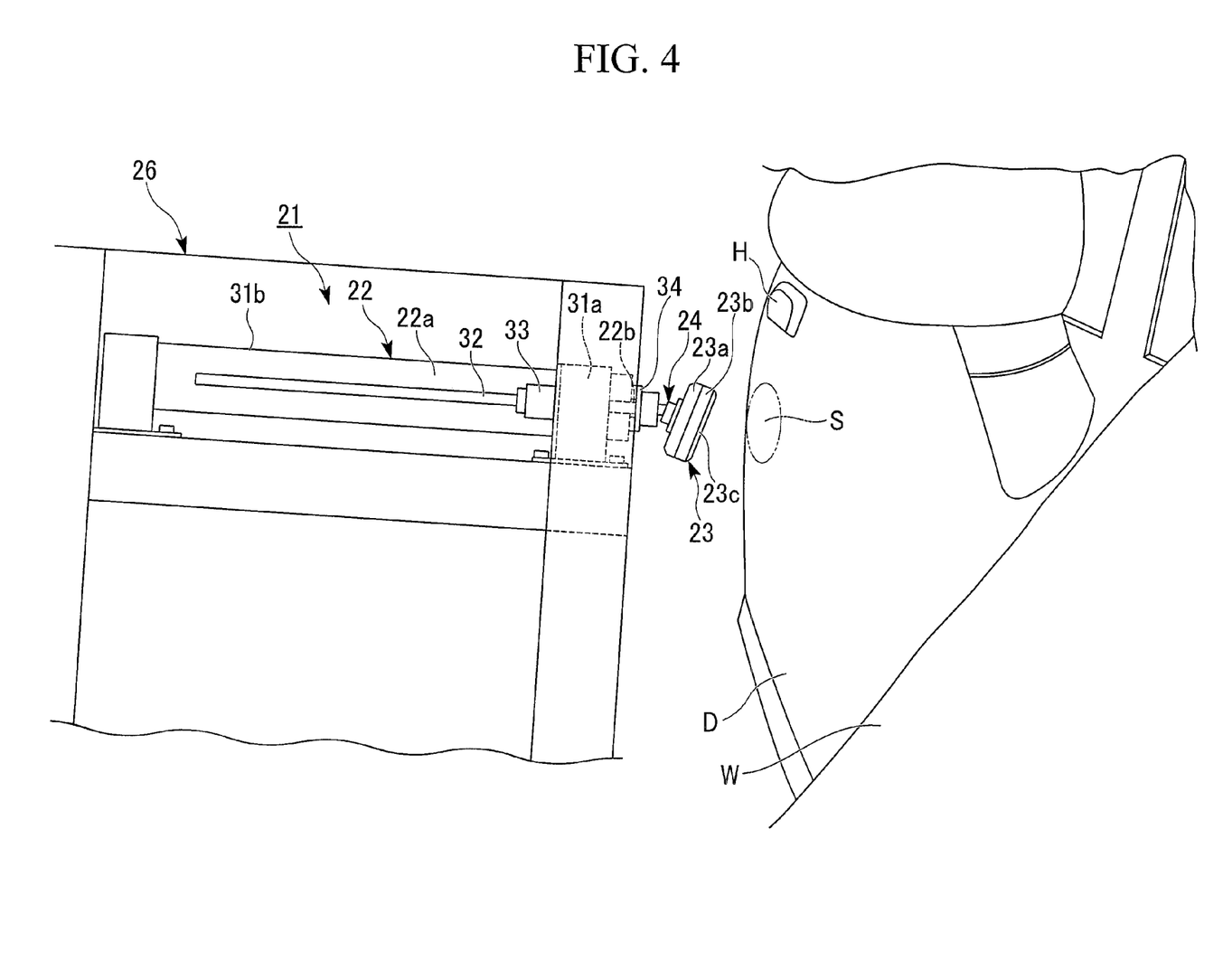
FIG. 4 is a view taking along an arrow B shown in FIG. 2.

That is, with also reference to FIGS. 2 to 4, plural types of the finished vehicles C are transferred to the finished vehicle inspection line 1; however, an angle of a pressed face S while performing closing operation of the door D, and the like, differs in accordance with the types of the vehicle. Therefore, even for the plural types of pressed faces S, by setting the above-mentioned rotational position of the door-closing devices 21 (the linear cylinder 22) around the vertical axis to the predetermined position, it is possible to vertically apply pressing force to the pressed face S. Moreover, the pressed face S on the door D is located, for example, the below of a position of a door outer handle H provided on the outer surface of the door D at the position where is the first opening stop position of the door checker.

Figure 5:
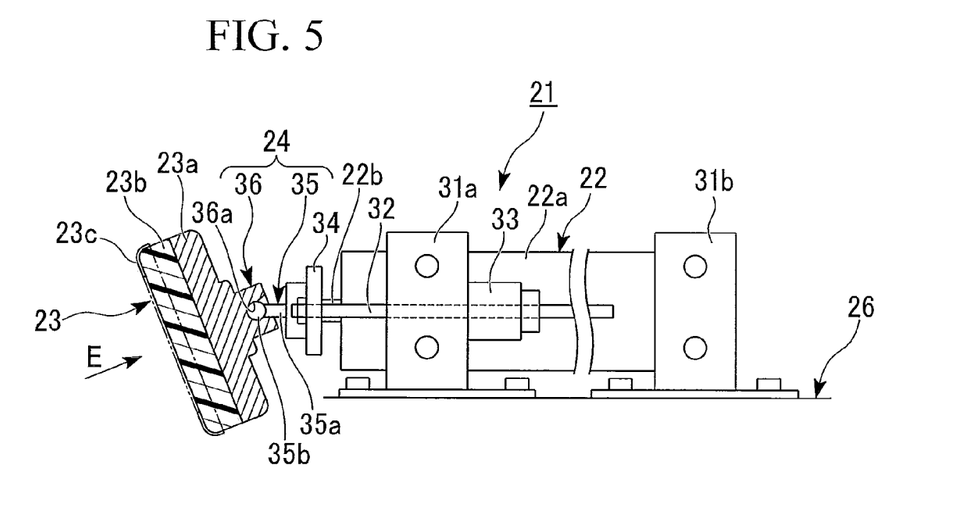
FIG. 5 is a side view of a door-closing device of the above-mentioned finished vehicle inspection line, including a partial cross section.

The linear cylinder 22 of the door-closing device 21 is supported at both ends thereof along the axial direction via brackets 31a and 31b on the base unit 26; and with this construction, the door-closing devices 21 is fixed onto the base unit 26 so as not to rotate with respect to the base unit 26.

The linear cylinder 22 is provided with a cylinder main body 22a and a rod 22b having a distal end that protrudes from the one end along the axis of the cylinder main body 22a; and stroking speed of the rod 22b is changed by for example an electrical control.

Figure 6:
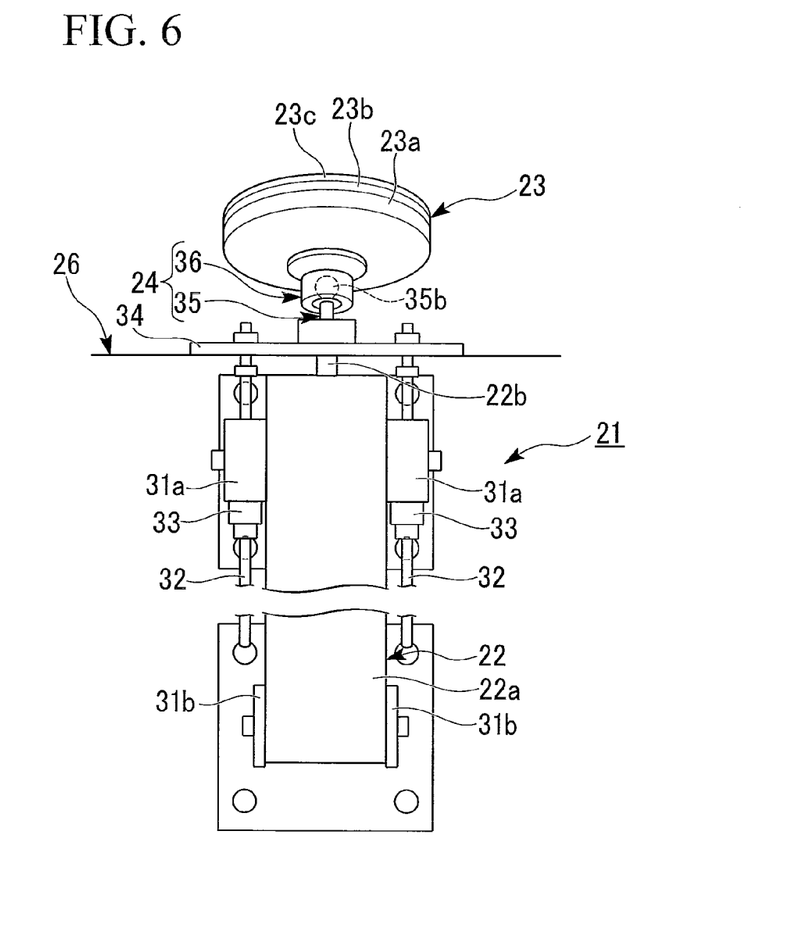
FIG. 6 is a plan view of the door-closing device.

As shown in FIGS. 5 and 6, a pair of guide rods 32 each extending from the linear cylinder 22 so as to be parallel therewith is provided on the both sides of the linear cylinder 22. Each of these guide rods 32 is held so as to be able to reciprocate along the axis thereof, by an insertion portion 33 that is unitarily provided to the bracket 31a that supports a rod-extending side end of the linear cylinder 22. One end of the each guide rod 32 is connected to a distal end of the rod 22b via a connecting plate 34 that is orthogonal to the guide rod 32.

Figure 7:
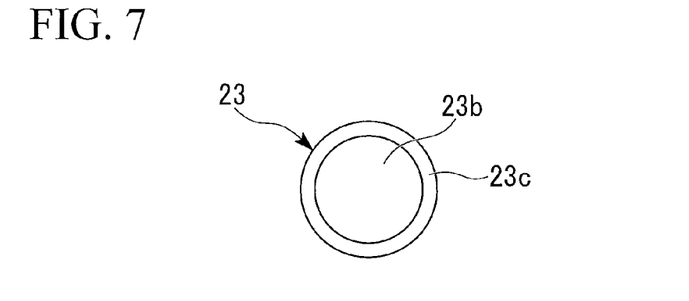
FIG. 7 is a view taking along an arrow E shown in FIG. 5.

The door-pressing pad 23 is attached via a ball joint 24 to an opposite side face (a front face) of the connecting plate 34 in relation to the linear cylinder 22. The door-pressing pad 23 has a disc shape that is substantially orthogonal to the axial direction of the rod 22b, and is provided with (i) a pad main body 23a that forms a member on the linear cylinder 22 side (the rear side) and is made of metal or hard resin material, and (ii) a resin pad 23b that forms the opposite side (the front side) of the pad main body 23a and is made of for example urethane resin material. The pad main body 23a and the resin pad 23b are unitarily provided. A silicon or fluoro resin tape 23c is circularly attached to the periphery of the resin pad 23b (refer to FIG. 7).

The ball joint 24 connects between a base portion 35 that protrudes from a front center portion of the connecting plate 34 so as to be coaxial with the rod 22b, and a holder portion 36 that protrudes from a rear center face of the pad main body 23a. A plastic sphere portion 35b having larger diameter than a supporting axis 35a is supported by the door-pressing pad 23 side of the base portion 35 via the supporting axis 35a. On the other hand, a holding hole 36a having a recessed sphere surface that conforms to the exterior of the sphere portion 35b is formed on the connecting plate 34 side of the holder portion 36. By engaging the sphere portion 35b with the holding hole 36a, the ball joint 24 is constructed that can be slanted around the sphere portion 35b.

While in a normal state (i.e., while the door-pressing pad 23 is not contact with the door D), the front face of the pad main body 23a directs slightly forward and downward (i.e., slightly slants forward and downward) in relation to the vertically facing the door D, by its weight. At this time, an upper front end of the peripheral portion of the pad main body 23a is located at the most front end of the door-pressing pad 23. Therefore, when the rod 22b of the linear cylinder 22 advances (extends), the front face leading edge of the forwardly inclining door-pressing pad 23 contacts the pressed face S of the door D. Thereafter, by further advancing the rod 22b, the door-pressing pad 23 inclines via the ball joint 24 such that the entire front face thereof becomes parallel with, and contact with the pressed face S of the door D.

The reason of employing the above-mentioned construction is that the shape of the door D of the finished vehicle C varies depending on the type of the vehicles (that is, the inclinations, the curves, and the like of an external face of the door D differ). That is, if the door-pressing pad 23 is fixed to the connecting plate 34 (i.e., to the rod distal end portion of the linear cylinder 22) so as not to be inclinable, then the front face of the door-pressing pad 23 will unevenly contact the pressed face S of the door D. As the result, a vector of the pressing force applied to the pressed face S varies, and thereby influences on the accuracy of the door closing-inspection.

In addition, by pasting a silicon or urethane made tape 23c onto the periphery of the front face of the door-pressing pad 23 that slidably contacts the pressed face S, it is possible to have smooth inclining motion of the door-pressing pad 23, and to prevent scratching a coating layer on the pressed face S of the door D, when the door-pressing pad 23 inclines while contacting with the pressed face S of the door D.

Next, operations of the door closing-inspection apparatus 10 will be explained below.

Firstly, as the finished vehicle C is transferred to the finished vehicle inspection line 1, the barcode reader 18 reads the barcode 18b of the inspection card 18a appended to the finished vehicle C at an initial process of this line, and the information necessary for specifying the type of the vehicle, the specification, and the like, are transmitted to the controller 14. Subsequently, after completing an inspection process adjacent on the upstream side to the vehicle door closing-inspection (a decoration inspection process, for example) to the finished vehicle C that is sequentially inspected while being transferred, the left and right doors D are opened until reaching to the opening stop position at the first stage of the door checker. Then, the finished vehicle C in this manner is transferred to the vehicle door closing-inspection that is the subsequent process.

Each of the rotational positions of the door-closing devices 21 is adjusted in advance to the most suitable position using the reference marking 28 of the turning table 25, the scaling portion 29, and locking bolt. Moreover, it may be arranged such that: changing and fixing of the rotational position of the turning table 25 is automated so as to be controlled by the controller 14; and the rotational position of the turning table 25 is automatically adjusted in accordance with the type of the vehicle, the specification, and the like, of the finished vehicle C.

When the first lightening and light-receiving device 11 detects that the finished vehicle C is transferred and entered to the vehicle door closing-inspection, the detection information is transmitted to the controller 14. The controller 14 calculates time necessary for the finished vehicle C to reach the predetermined door closing operation position (the position where the pressed face S of the door D becomes substantially orthogonal to an extension line of the rod 22b of the linear cylinder 22) based on the detection information from the first lightening and light-receiving device 11, transferring speed information from the driving source controller 17, and the type of the vehicle, the specification, and the like from the barcode reader 18. Then, after the calculated time has passed, the controller 14 extends the rod 22b of the linear cylinder 22 at the predetermined speed toward the door D side. At this time, the extension speed of the rod 22b is suppressed (20 mm/sec, for example) until the entire face of the door-pressing pad 23 contacts the pressed face S of the door D. Subsequently, after the entire face of the door-pressing pad 23 has contacted the pressed face S of the door D, the extension speed of the rod 22b is increased (190 mm/sec, for example) to perform the door closing operation.

While the door-pressing pad 23 presses the pressed face S of the door D with the extension of the rod 22b, as explained in the above, the door-pressing pad 23 is smoothly inclined and the entire face thereof contacts the pressed face S of the door D. With this operation, it is possible to prevent deformation of the pressed face S of the door D due to local concentration of the pressing force which may be caused by roughly contacting the forwardly inclining door-pressing pad 23 with a part of the pressed face S of the door D. Furthermore, by pasting the silicon or urethane made tape 23c onto the periphery of the front face of the door-pressing pad 23, it is possible to have smooth inclining motion of the door-pressing pad 23, and to prevent scratching the coating film on the pressed face S of the door D.

After the door closing operation, the rod 22b retracts toward the cylinder main body 22a side, and thereby returning to the original state which is before executing the door closing operation. Subsequently, when the second lightening and light-receiving device 12 detects that the finished vehicle C has began passing through the predetermined position where is more downstream side than the door closing operation position, this detection information is transmitted to the controller 14. The controller 14 calculates time until a predetermined region including the closed door D on the side face of the vehicle body W of the finished vehicle C starts passing through between the laser distance-measuring devices 13, and time to complete the passing through, based on the detection information from the second lightening and light-receiving device 12, transferring speed information from the driving source controller 17, and the type of the vehicle, the specification, and the like from the barcode reader 18. Then, based on the calculated time, the distance with respect to the side face of the vehicle body W is continuously measured so as to scan the predetermined range of the side face in the forward and the backward.

Since the above-mentioned distance measurement is executed while striding over the closed doors D, the controller 14 can determine whether the doors D are completely closed or not based on whether the measured result is within the geometrical tolerance zone or not. If it is determined that the doors D are not in completely closed condition (i.e., the doors D are incompletely closed), then the alarming device 15 is activated and the displaying device 16 located on the next process displays an indication to indicate that the doors D are incompletely closed. Furthermore, in the process next to the vehicle door closing-inspection, the inspection card 18a appended to the finished vehicle C is marked so as to indicate that the doors D are malfunctioned. This marking is confirmed at the final process of the finished vehicle inspection line 1, and at this stage, the finished vehicle C having malfunction in the door closing is transferred to the adjustment process, and the positional adjustment of the door striker, and the like are performed.

As has been explained in the above, the door closing-inspection apparatus 10 of the present embodiment is provided with: the first lightening and light-receiving device 11 that is arranged so as to stride over the slat conveyor 2 of the finished vehicle inspection line 1 that performs the inspection of the finished vehicle C while transferring it; the pair of door-closing devices 21 that are arranged at the positions where are more downstream side than the first lightening and light-receiving device 11, and are on the both sides of the length of the slat conveyor 2 so as to be symmetric; the second lightening and light-receiving device 12 that is arranged so as to stride over the slat conveyor 2, at the position where is more downstream side than the door-closing devices 21; the pair of laser distance-measuring devices 13 that are arranged at the positions where are more downstream side than the second lightening and light-receiving devices 12, and are on the both sides of the length of the slat conveyor 2 so as to be symmetric; and the controller 14 which is connected with the first and second lightening and light-receiving devices 11 and 12, the door-closing devices 21, the laser distance-measuring devices 13, and the driving source controller 17 of the slat conveyor 2. In addition, each of the door-closing devices 21 is provided with the linear cylinder 22 that can control the stroke length of the rod 22b, and the door-pressing pad 23 that is attached via the ball joint 24 to the rod distal end portion of the linear cylinder 22. In addition, each of the door-closing devices 21 is activated to close the opened door D provided on the both sides of the finished vehicle C, after the predetermined time has passed since the first lightening and light-receiving device 11 has detected the vehicle body W of the finished vehicle C. Furthermore, after the predetermined time has passed since the second lightening and light-receiving device 12 has detected the vehicle body W of the finished vehicle C, the laser distance-measuring devices 13 are activated to measure the distances with respect to the side faces of the vehicle body W, that are provided on the both sides of the finished vehicle C.

According to this construction, while sequentially transferring the finished vehicle C by the slat conveyor 2, the door-closing devices 21 are activated at the predetermined timing to push and close the doors D by the door-pressing pad 23. And thereafter, the laser distance-measuring devices 13 are activated at the predetermined timing for measuring the distances to the vehicular body side faces, and thereby continuously measuring the distances in relation to the side faces of the vehicle body W after closing the doors D while striding over them. By performing the above, it is possible to automatically inspect whether the doors D are completely closed by the predetermined closing operations.

That is, the inspection (the door closing-inspection) for confirming whether the doors D of the finished vehicle C can be completely closed under the predetermined condition, can be automatically executed on the finished vehicle inspection line 1; therefore, it is possible to largely reduce the number of processes in the inspection process for the finished vehicle.

In addition, by attaching the door-pressing pad 23 via the ball joint 24 to the rod distal end portion of the linear cylinder 22, it is possible to apply an adequate pressing force to the doors D having different inclinations and the like. Accordingly, it is easily applicable to the variety of finished vehicles C.

In addition, in the door closing-inspection apparatus 10, since the controller 14 is connected with the alarming device 15 and the displaying device 16 which indicate the results of the door closing-inspection, it is possible to easily and reliably identify the occurrence of the malfunction in the door closing of the finished vehicle C.

In addition, in the door closing-inspection apparatus 10, since the door-closing devices 21 are provided via the turning table 25 so as to be rotatable around the vertical axis and is fixable at an arbitrary rotational position, it is possible to easily realize the most suitable position of the door-closing devices 21 with respect to the variety of the finished vehicles C.

Furthermore, in the door closing-inspection apparatus 10, by employing the barcode reader 18 that reads the barcode 18b appended to the finished vehicle C and indicating the type of the vehicle and the specification, it is possible to automatically and easily set to the variety of finished vehicles C with the most suitable door closing timing and the most suitable vehicular body side face measuring timing.

In addition, the door closing-inspection method of the present embodiment is executed by the door closing-inspection apparatus 10 that is provided with: the first and second lightening and light-receiving devices 11 and 12 that are arranged near the slat conveyor 2 of the finished vehicle inspection line 1 that inspects the finished vehicle C while transferring it; the door-closing devices 21 that closes the opened doors D of the finished vehicle C at the predetermined speed; the laser distance-measuring devices 13 that detect the closing degree of the doors D after closing them; and the controller 14 to which the first and second lightening and light-receiving devices 11 and 12, the door-closing devices 21, the laser distance-measuring devices 13, and the driving source controller 17 of the slat conveyor 2, are connected. In this door closing-inspection method, the doors D are closed by activating the door-closing devices 21 based on the signals from the first lightening and light-receiving device 11 and the driving source controller 17, and the closing degrees of the doors D are inspected by activating the laser distance-measuring devices 13 based on the signals from the second lightening and light-receiving device 12 and the driving source controller 17.

According to this method, when the first lightening and light-receiving device 11 detects the vehicle body W of the finished vehicle C while sequentially transferring the finished vehicle C by the slat conveyor 2, if it is determined that the finished vehicle C is transferred to the predetermined door closing operation position based on the above-mentioned detected information and the transferring speed information from the driving source controller 17, then the door-closing devices 21 is activated thereafter to execute the predetermined door closing operations. Subsequently, after the second lightening and light-receiving device 12 has detected the vehicle body W of the finished vehicle C, if it is determined that the finished vehicle C has transferred to the predetermined door closing detection position based on the above-mentioned detected information and the transferring speed information from the driving source controller 17, then the predetermined door closing-inspection can be performed by activating the door closing-inspection apparatus 10. That is, the inspection (the door closing-inspection) for confirming whether the doors D of the finished vehicle C can be completely closed under the predetermined condition can be automatically executed on the finished vehicle inspection line 1; therefore, it is possible to largely reduce the number of processes in the inspection process for the finished vehicle.

Second Embodiment

Next, a second embodiment of the present invention will be explained below with reference to FIGS. 10 to 13.

The present embodiment differs in the following points from the above-mentioned first embodiment.

Figure 10:
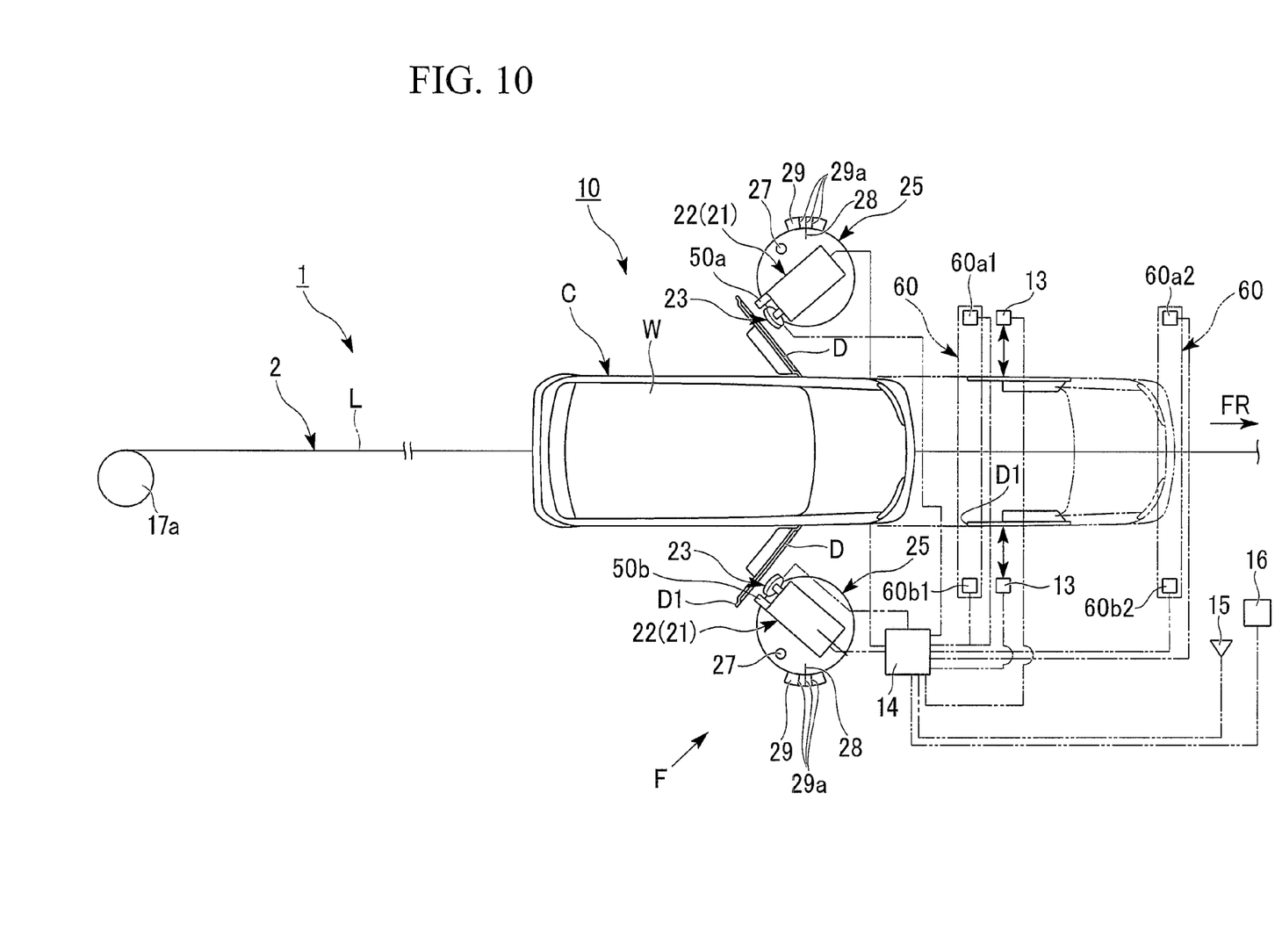
FIG. 10 is a plan view showing a general construction of a finished vehicle inspection line according to a second embodiment of the present invention.
Figure 11:
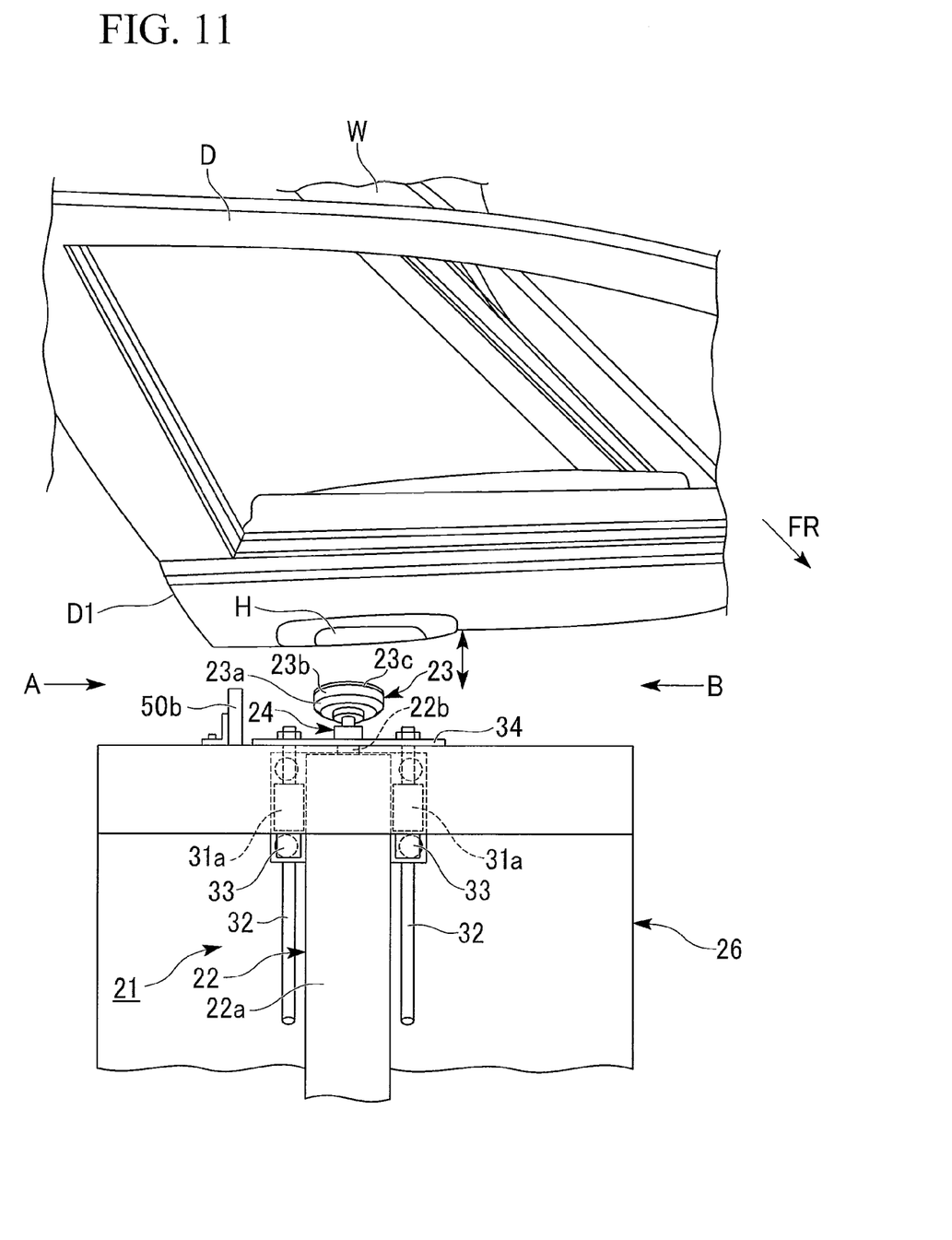
FIG. 11 is an enlargement view of an essential part of FIG. 10.
Figure 12:
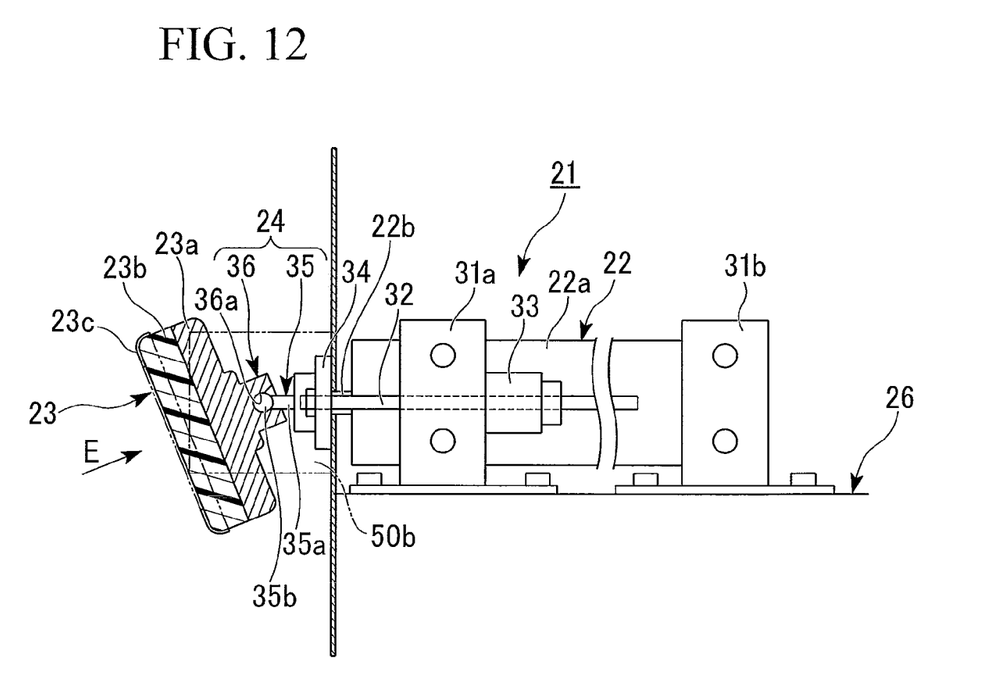
FIG. 12 is a side view of a door-closing device of the above-mentioned finished vehicle inspection line, including a partial cross section.
Figure 13:
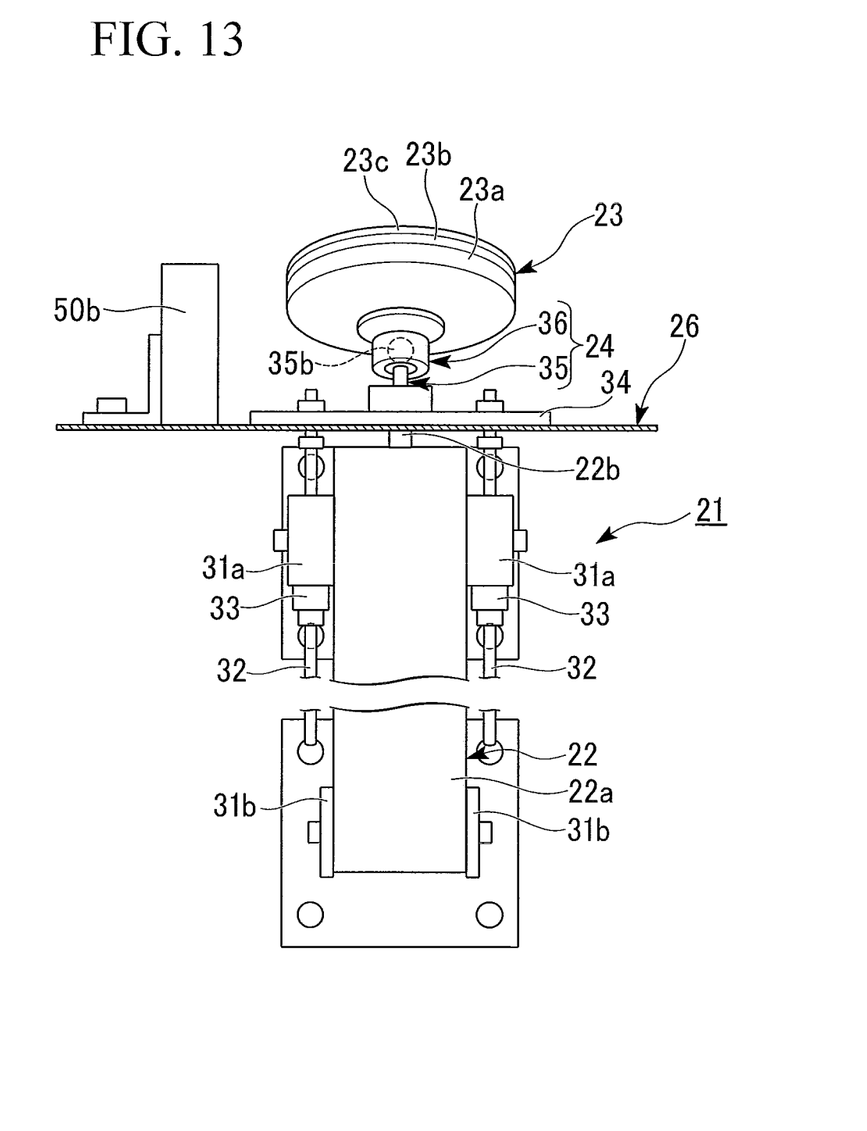
FIG. 13 is a plan view of the door-closing device.

That is, in the first embodiment, the first lightening and light-receiving device 11 is employed which is provided with the combination of the lightening device 11a including the photoelectric tube, and the light-receiver 11b corresponding to the lightening device 11a, so as to stride over the slat conveyor 2, on the more upstream side than the vehicle door closing-inspection process. On the other hand, in the present embodiment, laser distance-measuring devices 50a and 50b are each provided on the base unit 26 to which the door-closing devices 21 is fixed, at the more upstream side than the door-closing devices 21.

Furthermore, while executing the door closing-inspection, the laser distance-measuring devices 50a and 50b always emit laser beams. Then, when the finished vehicle C is transferred from the upstream, the distances between the door D and the laser distance-measuring devices 50a and 50b are measured, and the measurements are transmitted to the controller 14.

When the measured distances have reached the set value, the controller 14 transmits activation signals to the linear cylinders 22 of the door-closing devices 21. Then, the linear cylinders 22 are activated upon receiving the signal, and close the door D.

In addition, in the above-mentioned first embodiment, the second lightening and light-receiving device 12 is employed which is provided with the combination of the lightening device 12a including the photoelectric tube, and the light-receiver 12b corresponding to the lightening device 12a, so as to stride over the slat conveyor 2. On the other hand, in the present embodiment, second lightening and light-receiving devices 60 are provided at two locations where are more downstream side than the door-closing devices 21. These second lightening and light-receiving devices 60, 60 are provided with combinations of lightening devices 60a1, 60a2 each including the photoelectric tube, and the light-receivers 60b1, 60b2 corresponding to these, and each of them are arranged so as to stride over the slat conveyor 2. In addition, the laser distance-measuring devices 13 are provided between these two second lightening and light-receiving devices 60, 60.

In addition, the laser distance-measuring devices 13 are arranged so as to be located at positions where are more downstream side than end portions D1 of the doors D and are close to the end portions D1, when each of these two second lightening and light-receiving devices 60, 60 has detected the vehicle body W. With this arrangement, the positional relationship between the upstream side end portions D1 of the doors D and the vehicle body W can be measured reliably and in an accurate timing; therefore, the controller 14 can execute the analysis and the judgment in a short time.

In the present embodiment, it is not necessary to connect the driving source controller 17 and the controller 14, as the first embodiment. Therefore, since the positioned type (the fixed type) needs to be employed in the first embodiment; however, the positioned type (the fixed type) does not need to be employed in the present embodiment. Therefore, the door closing-inspection apparatus 10 can be freely movable. Accordingly, it is also possible to change the processing layout.

Moreover, the door-closing devices mentioned in the above embodiments can be used individually. For example, they are also applicable for the case in which a sampling inspection is performed at the outside of the finished vehicle inspection line, by periodically sampling one of the finished vehicles that are sequentially transferred by the slat conveyor of the finished vehicle inspection line, or by sampling a new type vehicle that needs quality checking and is individually transferred together with the finished vehicles by the slat conveyor of the finished vehicle inspection line. Furthermore, in order to avoid errors in the measurement results by the laser distance-measuring devices 13 due to the colors of the vehicle body, white or bright colored tape or the like may be pasted on the measurement positions on the vehicle body and the door, in advance at more upstream side than the door closing-inspection apparatus.

The constructions mentioned in the above embodiments are the examples of the present invention, and can be modified without departing the spirits of the present invention.

Industrial Applicability

It is possible to provide the vehicular door closing-inspection apparatus and vehicular door closing-inspection method that can reduce the number of processes in the inspection process, and is also easily applicable to inspections for the variety types of finished vehicles.

The invention claimed is:

1. A door closing-inspection apparatus for a vehicle comprising:
    a barcode reader arranged at an upstream side of a transferring conveyor in a finished vehicle inspection line which inspects a finished vehicle while transferring the finished vehicle;
    two door-closing devices arranged symmetrically on opposite lateral sides of axis (L) of the transferring conveyor in positions downstream of the bar code reader;
    a pair of first lightening and light-receiving devices arranged symmetrically on the opposite lateral sides of the axis (L) of the transferring conveyor and in positions adjacent to the two door-closing devices;
    two pairs of second lightening and light-receiving devices arranged symmetrically on the opposite lateral sides of the axis (L) of the transferring conveyor and in positions downstream of the door-closing devices;
    a pair of distance-measuring sensors arranged symmetrically on the opposite lateral sides of the axis (L) of the transferring conveyor and at positions between the two pairs of second lightening and light-receiving devices in a conveying direction of the apparatus; and
    a controller connected to the first lightening and light-receiving devices, the second lightening and light-receiving devices, the door-closing devices, and the distance-measuring sensors, wherein:
    the pair of first lightening and light-receiving devices measures a distance between the door and the pair of first lightening and light-receiving devices;
    the two pairs of second lightening and light-receiving devices detect a vehicular body of the finished vehicle;

each of the door-closing devices is provided with a linear cylinder which controls a rod stroke thereof, and a door-pressing pad which is attached via a spherical joint to a rod distal end portion of the linear cylinder;

each of the door-closing devices is activated to close an opened door of the finished vehicle at the same time as the first lightening and light-receiving devices has detected that a distance between the first lightening and light-receiving devices and the door has reached a predetermined distance; and each of the distance-measuring sensors is activated to measure a distance with respect to the vehicular body side face of the finished vehicle at the same time as the two pairs of the second lightening and light-receiving devices detect the vehicular body of the finished vehicle.

2. The door closing-inspection apparatus for a vehicle, according to claim 1, wherein each of the distance-measuring sensors is activated to measure the distance with respect to the vehicular body side face of the finished vehicle at the same time as a downstream pair of the second lightening and light-receiving devices detects a portion the vehicular body forward of the doors the finished vehicle, and an upstream pair of the second lightening and light-receiving devices detects a portion the vehicular body rearward of the doors the finished vehicle.

3. The door closing-inspection apparatus for a vehicle according to claim 1, wherein the pair of distance-measuring sensors arranged symmetrically on the opposite lateral sides of the axis (L) of the transferring conveyer is closer in a conveying direction of the apparatus to the pair of second lightening and light-receiving devices on an upstream side thereof than to the pair of second lightening and light-receiving devices on a downstream side thereof.

4. The door closing-inspection apparatus for a vehicle according to claim 1, wherein a distance along the vehicle inspection line between the distance-measuring sensors and the two pairs of second lightening and light-receiving devices downstream of the distance measuring sensors is a function of the distance between a front of the vehicle and the doors of the vehicle which are closed by the apparatus.

5. A door closing-inspection method for a vehicle, by a door closing-inspection apparatus for a vehicle provided with:

a barcode reader arranged at an upstream side of a transferring conveyer in a finished vehicle inspection line which inspects a finished vehicle while transferring the finished vehicle, a door-closing device arranged on each of two lateral sides of an axis (L) of the transferring conveyer of the finished vehicle inspection line which inspects a finished vehicle while transferring the finished vehicle, wherein the door-closing devices are arranged downstream of the barcode reader and closes each of the opened doors of the finished vehicle at a predetermined velocity;

a first pair of vehicular body detection devices arranged downstream of the door-closing devices;

a pair of door closing detection devices arranged symmetrically on opposite lateral sides of an axis (L) of the transferring conveyer and in positions downstream of and adjacent to the first pair of vehicular body detection devices in a conveying direction of the apparatus, wherein the door closing detection devices detect a degree of closing of the closed doors;

two pairs of second vehicular body detection devices arranged symmetrically on the opposite lateral sides of an axis (L) of the transferring conveyer and in positions downstream of the pair of door closing detection devices, and a controller connected to the first pair of vehicular body detection devices, the two pairs of second vehicular body detection devices, the door-closing devices, and the door closing detection devices, the door closing-inspection method for a vehicle comprising steps in the following sequence:

reading a barcode indicating information about the vehicle;

determining that a distance between the doors and the door closing detection devices have reached a predetermined distance based on a result of a measurement of a distance from each of the door closing detection devices, closing the doors by activating the door-closing devices to abut on a pressed face which is located below a position of a door outer handle of each of the doors, and to horizontally apply a pressing force to the pressed face at a predetermined velocity, receiving detection information from the two pairs of second vehicular body detection devices disposed upstream of the door closing detection devices; and detecting the degree of closing of each of the doors by activating the door closing detection devices at the same time as the two pairs of the second lightening and light-receiving devices detect the vehicular body of the finished vehicle.

6. The door closing-inspection method for a vehicle, according to claim 5, wherein the door closing detection devices initiate a signal to a display device indicating a result of the door closing-inspection only after receiving the detection information from the two pairs of second vehicular body detection devices.

7. The door closing-inspection method for a vehicle according to claim 5, wherein the pair of door closing detection devices are disposed along the vehicle inspection line between the first pair of vehicular body detection devices and the two pairs of second vehicular body detection devices.

8. The door closing-inspection method for a vehicle according to claim 7, wherein a distance along the vehicle inspection line between the door closing detection devices and the two pairs of second vehicular body detection devices downstream of the door closing detection devices is a function of the distance between a front of the vehicle and the doors of the vehicle which are closed by the method.

* * * * *